United States Patent [19]
Wolak et al.

[11] Patent Number: 5,912,189
[45] Date of Patent: Jun. 15, 1999

[54] COMPOSITIONS CONTAINING REACTION PRODUCT OF A CYCLIC COMPOUND CONTAINING BOTH A NITROGEN ATOM AND A CARBONYL GROUP, AN ALDEHYDE OR KETONE, AND AN ETHERAMINE

[75] Inventors: Thomas J. Wolak, Mentor; Richard M. Lange, Euclid, both of Ohio

[73] Assignee: The Lubrizol Corporation, Wickliffe, Ohio

[21] Appl. No.: 09/076,344

[22] Filed: May 12, 1998

[51] Int. Cl.$^6$ .......................... C10L 1/22; C07D 201/00; C07D 223/10
[52] U.S. Cl. ................................. 44/329; 44/338; 44/340; 540/531; 540/532; 540/533; 546/243; 546/246; 548/543; 548/550
[58] Field of Search ............................ 44/329, 338, 340; 540/531, 532, 533; 546/243, 246; 548/543, 550

[56] References Cited

U.S. PATENT DOCUMENTS

| | | | |
|---|---|---|---|
| 2,945,863 | 7/1960 | Buc et al. | 260/325.3 |
| 3,459,738 | 8/1969 | Morren | 540/531 |
| 3,536,699 | 10/1970 | Brachel et al. | 540/531 |
| 3,734,865 | 5/1973 | Heiba et al. | 44/329 |
| 4,081,456 | 3/1978 | Heiba et al. | 260/326.25 |
| 4,185,017 | 1/1980 | Piesch et al. | 540/532 |
| 4,185,965 | 1/1980 | Schlicht et al. | 44/63 |
| 4,760,152 | 7/1988 | Tracy et al. | 548/551 |
| 4,924,006 | 5/1990 | Anderson et al. | 548/550 |
| 4,958,032 | 9/1990 | O'Lenick, Jr. | 548/543 |
| 5,070,196 | 12/1991 | Masaki et al. | 540/450 |
| 5,352,251 | 10/1994 | Lin et al. | 44/340 |
| 5,376,152 | 12/1994 | Patil et al. | 44/330 |
| 5,384,406 | 1/1995 | Narayanan et al. | 546/243 |
| 5,458,660 | 10/1995 | Lin et al. | 44/340 |
| 5,507,843 | 4/1996 | Lin et al. | 44/329 |
| 5,516,343 | 5/1996 | Su | 44/419 |
| 5,837,867 | 11/1998 | Lin et al. | 540/200 |

OTHER PUBLICATIONS

Chemical Abstracts 128:63760e (vol. 128, No. 6, 1998).

*Primary Examiner*—Ellen M. McAvoy
*Attorney, Agent, or Firm*—Krishna G. Banerjee; David M. Shold

[57] ABSTRACT

The present invention is directed to a composition containing the reaction product of:

(A) a cyclic compound containing a 5, 6, or 7-member ring, the ring containing at least one nitrogen and at least one carbonyl group, at least one carbonyl group being adjacent to at least one said nitrogen;

(B) an aldehyde or ketone of 1 to about 15 carbon atoms, or a reactive equivalent thereof; and (C) an etheramine represented by the formula $$R^4(O(CH_2CH(R)O)_n-R^3-NH_2)_y \quad \text{(C-I)}$$

wherein in formula (C-I), each n independently is a number from 0 to about 50; each R independently is selected from the group consisting of hydrogen, hydrocarbyl groups of 1 to about 16 carbon atoms, and mixtures thereof; $R^3$ is selected from the group consisting of hydrocarbylene groups of about 2 to about 18 carbon atoms and groups represented by the formula

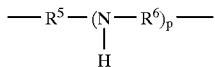

wherein $R^5$ and each $R^6$ are independently hydrocarbylene groups of about 2 to about 10 carbon atoms and p is a number from 1 to about 4; y is 1, 2 or 3; and $R^4$ is a hydrocarbyl group having a valence of y and containing 1 to about 50 carbon atoms when y is 1, and 1 to about 18 carbon atoms when y is 2 or 3.

These compositions are useful as fuel additives for reducing intake valve deposits and advantageously, they do not contribute to an increase in combustion chamber deposits in port fuel injected internal combustion engines. The invention also relates to concentrates and fuel compositions containing the foregoing fuel additive compositions and to a method for reducing intake valve deposits in an internal combustion engine.

38 Claims, No Drawings

COMPOSITIONS CONTAINING REACTION PRODUCT OF A CYCLIC COMPOUND CONTAINING BOTH A NITROGEN ATOM AND A CARBONYL GROUP, AN ALDEHYDE OR KETONE, AND AN ETHERAMINE

BACKGROUND OF THE INVENTION

1. Field of the Invention

The present invention relates to gasoline compositions effective for reducing intake valve deposits and which do not contribute to increased deposit formation in port fuel injected engines.

2. Description of the Related Art

It is well known to those skilled in the art that internal combustion engines form deposits on the surface of engine components, such as carburetor ports, throttle bodies, fuel injectors, intake ports, and intake valves, due to the oxidation and polymerization of hydrocarbon fuel. Deposits also form in the combustion chamber of an internal combustion engine as a result of incomplete combustion of the mixture of air, fuel, and oil. These deposits, even when present in relatively minor amounts, often cause noticeable driving problems, such as stalling and poor acceleration. Moreover, engine deposits can significantly increase an automobile's fuel consumption and production of exhaust pollutants. Specifically, when the gasoline used in a given engine is of a constant octane number, the power output decreases when deposits are formed. In order to maintain the power output at a predetermined desired level, it then becomes necessary to increase the octane number of the fuel over the course of time. This Octane Requirement Increase (ORI) is undesirable. Therefore, the development of effective fuel detergents or deposit control additives to prevent or control such deposits is of considerable importance, and numerous such materials are known in the art.

Two general classes of additives are commercially known. One class comprises hydrocarbyl-substituted amines such as those prepared by reacting olefins and olefin polymers with amines (including polyamines). Typical examples of this class are polybutenyl amines. Another class of additives comprises the polyetheramines. Usually, these are "single molecule" additives, incorporating both amine and polyether functionalities within the same molecule. A typical example is a carbamate product comprising repeating butylene oxide units under the trade name "Techron™" marketed by Chevron.

In some cases, the polyetheramines are preferred as the oxygenation (from the polyether functionality) is thought to lower particulate matter and nitrogen oxide (NOx) emissions and combustion chamber deposits. In addition, polyetheramines require little or no additional fluidizer oil to pass certain industry mandated valve stick requirements, resulting in a more economical final package. Polyisobutenyl amines, on the other hand, do require the addition of fluidizer oil to pass valve stick requirements and in addition are perceived to cause higher combustion chamber deposits than the fuel alone.

U.S. Pat. No. 5,352,251, Lin et al., Oct. 4, 1994 discloses a fuel composition comprising cyclic amide alkoxylate additive compounds of the formula

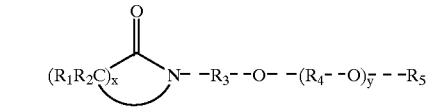

wherein x is from 2 to 20 and y is from 1 to 50. $R_1$ and $R_2$ are independently hydrogen or hydrocarbyl of 1 to 100 carbon atoms or substituted hydrocarbyl of 1 to 100 carbon atoms. $R_3$ is hydrocarbyl of 1 to 100 carbon atoms or substituted hydrocarbyl of 1 to 100 carbon atoms and $R_4$ is independently hydrocarbyl of 2 to 100 carbon atoms or substituted hydrocarbyl of 2 to 100 carbon atoms. $R_5$ is hydrogen, hydrocarbyl of 1 to 100 carbon atoms or substituted hydrocarbyl of 1 to 100 carbon atoms or acyl of 1 to 20 carbon atoms. These compounds have been disclosed to be useful for decreasing intake valve deposits, controlling octane requirement increases and reducing octane requirement. The patent also discloses novel cyclic amide alkoxylate compounds.

U.S. Pat. No. 5,516,343, Su, May 14, 1996 discloses a polyetheramide deposit control fuel or lubricant additive having the formula

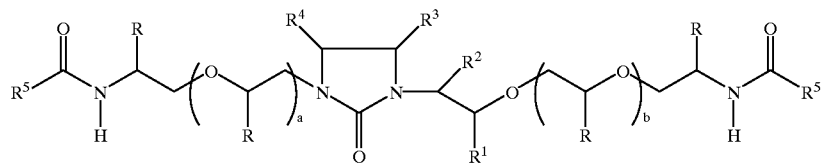

wherein each R is independently H or an alkyl group containing from 1 to about 16 carbon atoms, wherein each of $R^1$, $R^2$, $R^3$ and $R^4$ is independently selected from the group consisting of H and lower alkyl groups containing from about 1 to about 4 carbon atoms, and wherein each $R^5$ is independently a saturated or unsaturated hydrocarbon group containing from about 7 to about 22 carbon atoms, and wherein a+b ranges from 0 to about 80.

U.S. Pat. No. 4,081,456, Heiba et al., Mar. 28, 1978, discloses a compound having the structure:

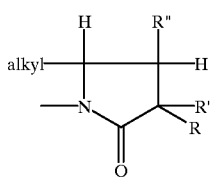

wherein the alkyl group has from 16 to 100 carbon atoms; R, R' and R" are individually selected from the group consisting of hydrogen, methyl and ethyl; and —N is the amino nitrogen of a lactam polyamine having the structure

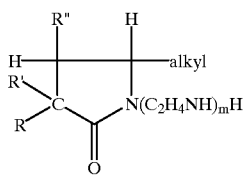

wherein m is an integer of 1 to 10 and R, R' and R" are individually selected as previously defined.

U.S. Pat. No. 2,945,863, Buc et al., Jul. 19, 1960, discloses amides of aminoalkyl pyrrolidones having the general formula

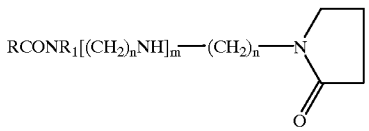

wherein R represents at least one hydrocarbon group containing from 5 to 22 carbon atoms, $R_1$ represents a member selected from the class consisting of hydrogen, lower alkyl and hydroxyalkyl of 1 to 5 carbon atoms, m represents a numerical ranging from 0 to 1 to 3 and n represents a positive integer of 2 to 3.

SUMMARY OF THE INVENTION

The present invention relates to a composition comprising the reaction product of:

(A) a cyclic compound containing a 5, 6, or 7-member ring, said ring containing at least one nitrogen and at least one carbonyl group, at least one said carbonyl group being adjacent to at least one said nitrogen;

(B) an aldehyde or ketone of 1 to about 15 carbon atoms, or a reactive equivalent thereof; and (C) an etheramine represented by the formula $$R^4(O(CH_2CH(R)O)_n - R^3 - NH_2)_y \qquad \text{(C-I)}$$

wherein in formula (C-I), each n independently is a number from 0 to about 50; each R independently is selected from the group consisting of hydrogen, hydrocarbyl groups of 1 to about 16 carbon atoms, and mixtures thereof; $R^3$ is selected from the group consisting of hydrocarbylene groups of about 2 to about 18 carbon atoms and groups represented by the formula

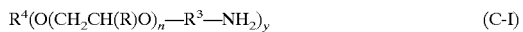

wherein $R^5$ and each $R^6$ are independently hydrocarbylene groups of about 2 to about 10 carbon atoms and p is a number from 1 to about 4; y is 1, 2 or 3; and $R^4$ is a hydrocarbyl group having a valence of y and containing 1 to about 50 carbon atoms when y is 1, and 1 to about 18 carbon atoms when y is 2 or 3.

These compositions are useful as fuel additives for reducing intake valve deposits and advantageously, they do not contribute to an increase in combustion chamber deposits in port fuel injected internal combustion engines. The invention also relates to concentrates and fuel compositions containing the foregoing fuel additive compositions and to a method for reducing intake valve deposits in an internal combustion engine.

DETAILED DESCRIPTION OF THE INVENTION

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

A hydrocarbylene group is a divalent hydrocarbyl group.

The phrase "reactive equivalent" of a material means any compound or chemical composition other than the material itself which reacts or behaves like the material itself under the reaction conditions. Thus for example, reactive equivalents of carboxylic acids include acid-producing derivatives such as anhydrides, acyl halides, and mixtures thereof unless specifically stated otherwise.

The Cyclic Compound (A)

The cyclic compound of the present invention contains a 5, 6, or 7-member ring, said ring containing at least one nitrogen and at least one carbonyl group, at least one said carbonyl group being adjacent to at least one said nitrogen.

Suitable cyclic compounds include lactams (cyclic amides), succinimides (cyclic imino diones), piperidinediones, piperazinones, piperzinediones, isocyanuric acid, barbituric acid, cyclic ureas and oxazolidones.

The lactams can be represented by the formula

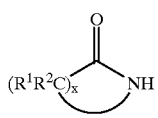

(A-I)

wherein in formula (A-I) $R^1$ and $R^2$ are independently selected from the group consisting of hydrogen and hydrocarbyl of 1 to about 50 carbon atoms or wherein at least two of the hydrocarbyl groups together form a cyclic hydrocarbyl structure; and x is a number from 3 to 5.

Examples of suitable lactams encompassed by the above lactam structure include substituted or unsubstituted 2-pyrrolidones, ε-caprolactams, and δ-valerolactams. In one embodiment, the cyclic compound is 2-pyrrolidone. In another embodiment, the cyclic compound is ε-caprolactam.

The succinimides include:

a) Hydrocarbyl-substituted succinimides represented by the structure

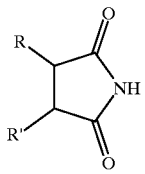

(A-II)

wherein in formula (A-II), R and R' are independently selected from the group consisting of hydrogen and hydrocarbyl groups of 1 to about 100 carbon atoms, and in one embodiment about 12 to about 100 carbon atoms; or wherein R and R' together form a cyclic structure;

b) Phthalimides represented by the structure

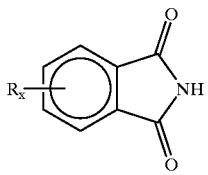

(A-III)

wherein in formula (A-III), each R independently is a hydrogen, a hydrocarbyl group of 1 to 100 carbon atoms and in one embodiment about 12 to about 50 carbon atoms, or wherein at least two t groups together form a cyclic structure; x is a number from 1 to 4 and represents the number of R groups; and by the structure

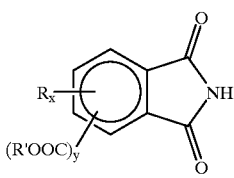

(A-IV)

wherein in formula (A-IV), each R independently is a hydrogen or a hydrocarbyl group of 1 to about 20 carbon atoms, and in one embodiment about 5 to about 18 carbon atoms; each R' independently is selected from the group consisting of hydrogen, a hydrocarbyl group of 1 to about 5 carbon atoms, a hydroxyalkyl group of 1 to about 5 carbon atoms, and an aminoalkyl group of 1 to about 5 carbon atoms; x and y are independently numbers from 1 to 4, with the proviso that the sum of x and y cannot exceed 4;

d) Hydrocarbyl-substituted Piperidinediones (Glutarimides), represented by the structure

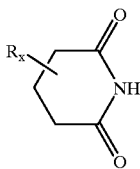

(A-V)

wherein in formula (A-V), each R independently is hydrogen, a hydrocarbyl group of 1 to about 100 carbon atoms and in one embodiment from about 12 to about 50 carbon atoms, or wherein at least two R groups together form a cyclic structure; x represents the number of R groups and is a number from 1 to 3.

Although the above structures of the cyclic imides show only one cyclic imide functionality, bis- structures containing two cyclic imide functionalities are also within the scope of the succinimides of this invention.

The piperazinones include those represented by the structure

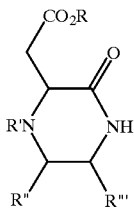

(A-VI)

wherein in formula (A-VI), R is hydrogen or a hydrocarbyl group of 1 to about 100 carbon atoms, and in one embodiment about, 12 to about 50 carbon; R' is a hydrocarbyl group of 1 to about 100 carbon atoms and in one embodiment about 12 to about 50 carbon atoms, or hydroxyalkyl group about 2 to about 20 carbon atoms, and in one embodiment about 2 to about 10 carbon atoms; and R" and R'" are independently hydrogen or hydrocarbyl groups of 1 to about 10 carbon atoms.

The piperidinediones include those represented by the structure

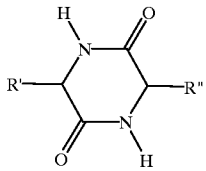

(A-VII)

wherein in formula (A-VII), R' and R" are independently hydrogen or hydrocarbyl groups of 1 to 100 carbon atoms, and in one embodiment about 12 to about 50 carbon atoms.

Isocyanuric acid can be represented by the structure

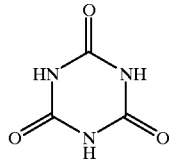

(A-VIII)

A reactive equivalent of isocyanuric acid is its tautomer, cyanuric acid (1,3,5-triazine-2,4,6-triol) represented by the structure

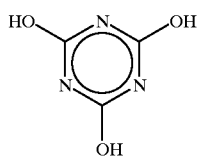

(A-IX)

Through common usage, both forms are sometimes called "cyanuric acid".

Barbituric acid is represented by the formula

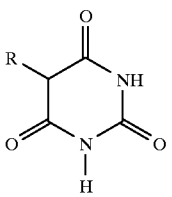

(A-X)

wherein in formula (A-X), R is a hydrogen or hydrocarbyl group of 1 to about 100 carbon atoms, and in one embodiment about 12 to about 50 carbon atoms.

The cyclic ureas include ethylene ureas represented by the formula

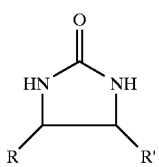

(A-XI)

wherein in formula (A-XI), R and R' independently are hydrogen, hydrocarbyl groups of 1 to about 100 carbon atoms, and in one embodiment about 12 to about 50 carbon atoms, or wherein R and R' groups together form a cyclic structure. An example of a cyclic urea is the compound "ethylene urea" itself (wherein both R and R' in above formula are hydrogen).

The oxazolidones include those represented by the structure

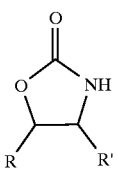

(A-XII)

wherein in formula (A-XII), R and R' independently are hydrogen, hydrocarbyl groups of 1 to about 100 carbon atoms, and in one embodiment about 12 to about 50 carbon atoms, or wherein R and R' together form a cyclic structure.

The Aldehyde or Ketone (B)

The aldehyde or ketone of this invention contains 1 to about 15 carbon atoms, and in one embodiment about 1 to about 5 carbon atoms, or a reactive equivalent thereof. Suitable aldehydes include formaldehyde, benzaldehyde, acetaldehyde, the butyraldehydes, and heptanals. Suitable ketones include acetone, 2-propanone, 2-butanone, and acetophenone. Reactive equivalents of aldehydes and ketones are also included as suitable reactants. The phrase "reactive equivalent" of a material, means any compound or chemical composition other than the material itself which reacts like the material itself under the reaction conditions. Examples of reactive equivalents of formaldehyde include paraformaldehyde, and formalin (an aqueous solution of formaldehyde). Reactive equivalent of ketones include hemiketals and ketals represented by the following structures

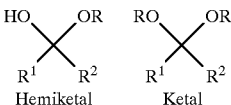

(B-I)

wherein in formulae (B-I), for either the hemiketal or ketal structure shown, $R^1$ and $R^2$ independently are hydrocarbyl groups of 1 to about 13 carbon atoms, and in one embodiment 1 to about 4 carbon atoms; with the proviso that the total number of carbon atoms in the sum of $(R^1+R^2)$ groups does not exceed about 14 carbon atoms; and R is a hydrocarbyl group of 1 to about 10 carbon atoms, and in one embodiment 1 to about 5 carbon atoms.

Formaldehyde and its reactive equivalents (such as paraformaldehyde and 1,3,5-trioxane), are the preferred aldehydes used to make the product of the present composition. Mixtures of aldehydes and ketones may also be used as reactants for the composition.

The Etheramine (C)

The etheramine used to make the composition of this invention can be represented by the formula

(C-I)

wherein in formula (C-I) each n is a number from 0 to about 50, and in one embodiment 0 to about 25, and in one embodiment about 20 to about 40; each R is selected from the group consisting of hydrogen, hydrocarbyl group of 1 to about 16 carbon atoms, and in one embodiment 1 to about 5 carbon atoms, and mixtures thereof; $R^3$ is selected from the group-consisting of a hydrocarbylene group of about 2 to about 18 carbon atoms, and in one embodiment about 2 to about 6 carbon atoms, and a group represented by the formula

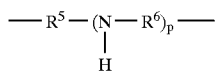

wherein $R^5$ and each $R^6$ are independently hydrocarbylene groups of about 2 to about 10 carbon atoms, and in one embodiment about 2 to about 5 carbon atoms; p is a number from 1 to about 4, and in one embodiment 1 to 2; y is 1, 2 or 3; and each $R^4$ is a hydrocarbyl group having a valence of y and containing 1 to about 50 carbon atoms, and in one embodiment 1 to about 20 carbon atoms, when y is 1; and 1 to about 18 carbon atoms, and in one embodiment 1 to about 10 carbon atoms, when y is 2 or 3.

The etheramine can include a monoetheramine, wherein n in the above formula (C-I) is zero, as well as a polyetheramine, wherein n in the above formula (C-I) is at least one.

The etheramine can include up to three primary amine functionalities (i.e., y in the above formula can have values of 1, 2, or 3), as well as compounds having a primary and secondary amine functionality in the same molecule.

The etheramines having one primary amino group include those where $R^3$ in the above formula (C-I) is a hydrocarbylene group, so that the etheramine is represented by the formula $$R^4O(CH_2CH(R)O)_nR^3\ NH_2 \hspace{2cm} \text{(C-II)}$$

wherein in formula (C-II), $R^4$ is a hydrocarbyl group having 1 to about 50 carbon atoms, and in one embodiment 1 to about 25 carbon atoms, and in one embodiment 10 to about 20 carbon atoms, and in one embodiment 20 to about 40 carbon atoms; n is a number from 0 to about 50, and in one embodiment 0 to about 25, and in one embodiment about 20 to about 40; R is defined as in formula (C-I).above; and $R^3$ is a hydrocarbylene group of about 2 to about 18 carbon atoms, and in one embodiment about 2 to about 6 carbon atoms. Preferably R is methyl, ethyl, or mixtures thereof. These correspond to the etheramine having propylene oxide (PO) or butylene oxide (BO) repeat units which are more soluble in gasoline than etheramines having ethylene oxide (for which R is hydrogen in above formula (II)) repeat units, although etheramines having mixtures of ethylene oxide (EO) and higher alkylene oxide repeat units are also contemplated for use in the fuel compositions of this invention.

One type of etheramines having one primary amine functionality and encompassed by the above structural general formula (C-II) are etheramines represented by the formula $$R^4O(CH_2CH(R)O)_nCH_2CH(R)NH_2 \hspace{2cm} \text{(C-III)}$$

wherein in formula (C-III), R and $R^4$ are defined as in formula (C-II) above and n is 1 to about 50, and in one embodiment 1 to about 25 carbon atoms, and in one embodiment about 10 to about 20 carbon atoms, and in one embodiment about 20 to about 40 carbon atoms. These etheramines are the preferred etheramines of this invention. These etheramines are prepared by reaction of a monohydric alcohol initiator with an alkylene oxide (typically EO, PO, or BO followed by conversion of the resulting terminal hydroxyl group to an amine. Examples of these include the commercial JEFFAMINE™ M-Series of polyetheramines, manufactured by Huntsman Chemical company, which are prepared using ethylene and/or propylene oxide and have a terminal—$CH_2CH(CH_3)NH_2$ group. Among these JEFFAMINE™ M-600 and M-2005 are predominantly PO based having a mole ratio of PO/EO of approximately 9/1 and 32/3 respectively. These will typically have greater solubility in the hydrocarbon fuels than polyetheramines having higher concentration of EO units in the chain.

Examples of polyetheramines of formula (C-III) wherein $R^4$ is nonylphenyl include the SURFONAMINE™ series of surface active amines, manufactured by Huntsman Chemical Company. The series consist of amines represented by the formula $$R^4-(OCH_2CH_2)_a-(OCH_2CH(CH_3)_b-NH_2 \hspace{2cm} \text{(C-IV)}$$

wherein in formula (C-IV), $R^2$ is p-nonylphenyl, and the a/b ratio ranges from 1/2 to 12/2 as well as amines containing only PO units.

In one embodiment of formula (C-III) above, R is methyl, and $R^4$ is nonylphenyl.

Polyetheramines which are end capped with one or a few units of EO may also be useful. Thus the etheramine can be represented by the formula $$R^4O(CH_2CH(CH_3)O)_{10\text{-}30}(CH_2CH_2O)_{1\text{-}5}CH_2CH_2NH_2 \hspace{1cm} \text{(C-V)}$$

wherein in formula (C-V), $R^4$ is a hydrocarbyl group of about 10 to about 20 carbon atoms.

A useful class of etheramines are those that can be obtained from the reaction of an etherol with a polyamine in the presence of a metal (such as Nickel) catalyst. A process for preparing such etheramines is disclosed for example in U.S. Pat. No. 4,888,447. This patent discloses a process for selectively preparing alkoxylated tertiary amine compounds, such as aminated ethoxylated amines, at ambient pressure by reacting an oxyalkylated alcohol with a secondary amine in the presence of a reductive amination catalyst (such as a combination of Raney nickel and molybdenum) at above ambient temperature.

In one embodiment, this class of etheramines can be represented by the formula $$R^4O(CH_2CH(R)O)_nCH_2CH(R)(NH\ CH_2CH_2)_kNH_2 \hspace{1cm} \text{(C-VI)}$$

wherein in formula (C-VI), k is number from 1 to about 5; n is number from 0 to about 50, and in one embodiment 0 to about 25, and in one embodiment about 20 to about 40; and R and $R^4$ are defined as in formula (C-II) above.

Another useful class of etheramines are those represented by the formula $$R^4O(CH_2CH(R)O)_n((CH_2)_3NH)_qH \hspace{2cm} \text{(C-VII)}$$

wherein in formula (C-VII), q is number from 1 to 5; n is number from 0 to 50, and in one embodiment 0 to about 25, and in one embodiment about 20 to about 40; and R and $R^4$ are defined as in formula (C-II) above. These can usually be prepared by cyanoethylating an adduct of an alcohol, or alkylphenol and an alkylene oxide with acrylonitrile and hydrogenating the obtained product, and, if necessary, followed by the repetition of the cyanoethylation and the hydrogenation steps. The cyanoethylation is typically conducted by stirring the reaction system under heating in the presence of a strong base catalyst such as caustic alkali. The hydrogenation can be conducted in the presence of a hydrogenation catalyst such as Raney nickel. In one embodiment, $R^4$ in the above formula (C-VII) is an alkyl group of about 12 to about 15 carbon atoms, R is methyl and q is 1.

In one embodiment the etheramine of formula (C-VII) is represented more specifically by the formula $$R^4O(CH_2CH(R)O)_n(CH_2)_3NH_2 \hspace{2cm} \text{(C-VIII)}$$

wherein in formula (C-VIII), n is 1 to about 50, and in one embodiment 0 to about 25, and in one embodiment about 20 to about 40; R is methyl; and $R^4$ is a hydrocarbyl group of about 10 to about 18 carbon atoms.

When n in the above formula (C-VIII) is zero, the etheramine is a monoetheramine. Examples of monoetheramines of the above formula (C-VIII) include the commercial etheramines produced and marketed by Tomah Products, Inc. These etheramines are represented by the formula $R^4OR^1NH_2$ where $R^1$ is an alkylene group of about 2 to about 6 carbon atoms, and $R^4$ is defined as in formula (C-II) above. These primary ether amines are generally prepared by the reaction of an alcohol $R^4OH$ with an unsaturated nitrile. The nitrile reactant can have from about 2 to about 6 carbon atoms with acrylonitrile being most preferred. When acrylonitrile is used, the monoetheramine is represented by the formula $R^4O(CH_2)_3NH_2$, wherein $R^4$ is defined as in formula (C-II) above. Typical of such etheramines are those having from about 150 to about 400 molecular weights.

An example of a useful monoetheramine is isotridecyloxypropylamine ($C_{13}H_{27}O(CH_2)_3NH_2$), available commercially from Tomah as "PA-17"™.

Examples of monoetheramines represented by formula (C-VII) wherein n is zero and q is 2 are ether diamines represented by the formula $R^4O(CH_2)_3NH(CH_2)_3NH_2$ wherein $R^4$ is as described in formula (C-II). These ether diamines are available from Tomah Products, Inc. Specific examples include isotridecyloxypropyl-1,3 diamino propane ("DA-17"™) and Octyl/decyloxypropyl-1,3-diamino propane ("DA-1214"™) containing mixed alkyl groups.

Etheramines having two or three primary amine functionalities include the JEFFAMINE™ diamines and triamines respectively manufactured by Huntsman Chemical Company.

The JEFFAMINE™ diamines include the D-series represented by the structure

$$H_2NCH(CH_3)CH_2-(OCH_2CH(CH_3))_x-NH_2 \quad \text{(C-IX)}$$

wherein in formula (C-IX), x ranges from about 2 to about 66, with molecular weights ranging from about 230 to about 4000.

The JEFFAMINE™ triamines include the JEFFAMINE™ T-Series which are PO based triamines and are prepared by reaction of a PO with a triol initiator, followed by amination of the terminal hydroxyl groups. They are represented by the formula (C-X)

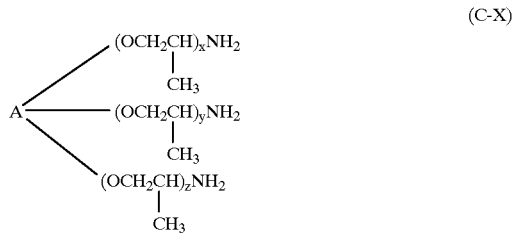

wherein in formula (C-X), A is a triol initiator and x, y, and z represent the number of repeat units of propylene oxide. The values of x, y, and z are such that the molecular weight of the triamine ranges from about 440 to about 5000. An example of a triol initiator is glycerol.

Mixtures of etheramines, including mixtures of different monoetheramines, a monoetheramine and a polyetheramine and different polyetheramines can be used in the reaction with the aldehyde and are within the scope of this invention.

The reaction of the cyclic compound, the aldehyde or ketone and the polyetheramine results in a condensation product wherein the carbonyl carbon of the aldehyde or ketone forms a bond with an amide nitrogen of the cyclic compound, and also with the amine nitrogen of the polyetheramine.

As an illustration, the reaction of pyrrolidone with formaldehyde and a polyetheramine can be represented by the following scheme:

Scheme 1

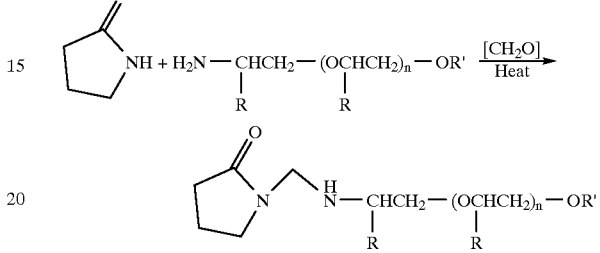

wherein n, R and R' have the same meaning respectively as n, R and $R^4$ of formula (C-III) above.

The mole ratio of the cyclic compound to the aldehyde or ketone to the etheramine will depend on the precise identity of each of these components. For example, when the cyclic compound is a lactam, and the etheramine is monofunctional, having only one primary amine functionality as in the above scheme, this ratio will typically be about 1:1:1.

However, it is also possible to envision a condensation product from an ethermonoamine using about 2:2:1 mole ratio of a lactam cyclic compound to the aldehyde or ketone to the etheramine, represented by the following scheme (using pyrrolidone as the cyclic compound and formaldehyde as the aldehyde as illustrative examples):

Scheme 2

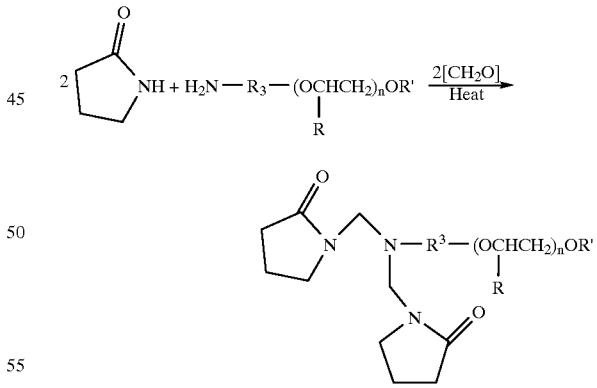

wherein n, R and R' have the same meaning respectively as n, R and $R^4$ of formula (C-III) above and $R^3$ is a hydrocarbylene group of about 2 to about 18 carbon atoms. The above condensation product with the two (Pyrrolidone-$CH_2$) groups on the same nitrogen is more likely to be formed if the starting etheramine has a primary carbon atom attached to the amine functionality (i.e., a less hindered etheramine). However, as discussed below, substantial amounts of substituted perhydro 1,3,5-triazines can also form as a reaction product.

When the etheramine is difunctional however, having two primary amine functionalities, or one primary amine and one secondary amine functionality (such as those obtained from two sequential cyanoethylation/hydrogenation reactions on a polyetherol) the mole ratio of the above reactants can also be about 2:2:1. As an illustration, the reaction of pyrrolidone with formaldehyde and a difunctional polyetheramine can be represented by the following scheme:

Scheme 3

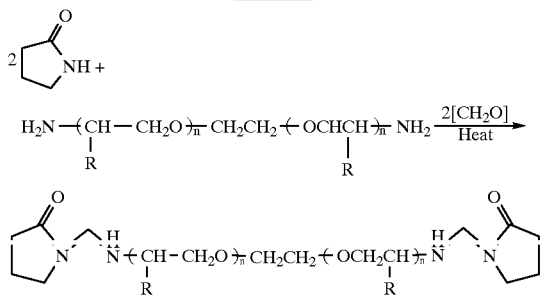

wherein n and R are defined as above in formula (C-I).

An example of a reaction between a polyether diamine (such as those obtained from sequential cyanoethylation/hydrogenation steps), aldehyde or ketone and the cyclic compound (such as 2-pyrrolidone) can be represented by the following scheme:

Scheme 4

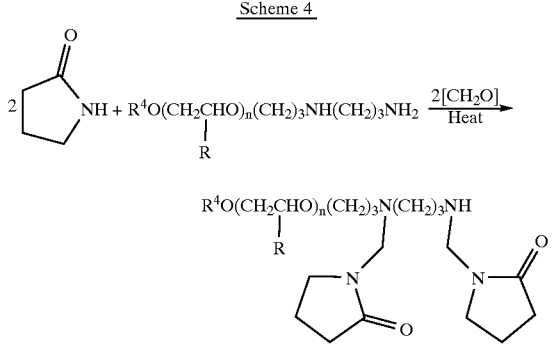

wherein $R^4$ and R are defined as above in formula (C-II).

It is stressed herein that the above schemes are only used for illustrative purposes only, illustrating certain of the embodiments of the present invention. They are not to be taken as limiting the scope of the invention which is set forth in the claims. Furthermore, the structures shown in the above schemes are approximately representations only. By such representation it is not meant that the structure shown in the schemes above as the product is the only proper representation of the product. The product may comprise a complex mixture of various chemical species, no effort being made to elucidate the precise structure of these various species by the schemes shown here. Thus while not wishing to be bound by theory, the structures of various compounds shown in the above schemes are believed to be accurate but approximate representations of various products that may form in the reactions shown.

Schemes 3 and 4 above illustrate reactions of a cyclic amide, aldehyde (or ketone) and a difunctional etheramine. Similarly, it is possible to envision reactant mole ratios of about 3:3:1 respectively of a lactam cyclic compound, an aldehyde (or ketone) and an etheramine when a trifunctional amine (such as one represented by formula (C-X)) is used.

In one embodiment, the mole ratio of 2-pyrrolidone to formaldehyde to an etheramine is about 1:1:1, and in one embodiment, the mole ratio is 2:2:1.

In one embodiment, where the cyclic compound is ethylene urea, the aldehyde is formaldehyde and the etheramine is a primary etheramine, the mole ratio of these three reactants is 1:2:2 respectively.

In one embodiment, where the cyclic compound is barbituric acid, the aldehyde is formaldehyde and etheramine is a primary etheramine, the mole ratio of these reactants is 1:2:2 respectively.

When the etheramine is such that the amine functionality is attached to a primary rather than a secondary carbon atom (thereby rendering the etheramine less hindered), the reaction product of the cyclic compound, aldehyde (or ketone) and the etheramine may not comprise as the major component a compound which incorporates the starting cyclic compound, but instead may, for example comprise as the major component a substituted perhydro 1,3,5-triazine (hereinafter "triazine") represented by the formula

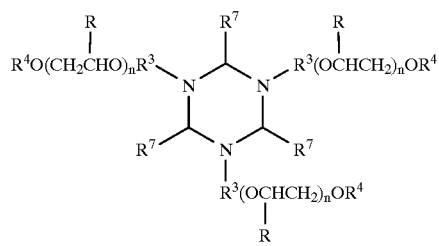

wherein n, R, $R^3$ and $R^4$ are defined as in formula (C-II) above and $R^7$ is hydrogen or a hydrocarbyl group of 1 to about 14 carbon atoms corresponding to the hydrocarbyl group of the aldehyde of this invention. The claimed condensation product, incorporating the starting cyclic compound, is still formed but typically as a minor component (typically less than about 50%) of the product mixture. Typically, such product mixtures, when the starting aldehyde is formaldehyde or a reactive equivalent thereof, may contain about 60 to about 80 weight % of the triazine and about 20 to about 40 weight % of the condensation product incorporating the cyclic compound, as determined by gel permeation/size exclusion chromatography. The product mixture may also contain other minor components.

The triazine component is formed by the reaction of formaldehyde and the polyetheramine of this invention. As such there will be substantial amounts of unreacted cyclic compound. It is believed however, that substantial amounts of unreacted cyclic compound may remain only where the etheramine is such that the amine functionality in the etheramine is attached to a primary carbon, and when the aldehyde used is formaldehyde or a reactive equivalent thereof. Thus the etheramines made by the cyanoethylation/hydrogenation route as described hereinbefore will be the less hindered etheramines, having a primary amine group attached to a methylene (—CH$_2$—) group. These etheramines are most likely to produce the triazine as the major component of the reaction product. Therefore the preferred etheramines of this invention are those where the amine functionality is attached to a secondary carbon atom.

The fuel compositions of the present invention comprise a major portion of a liquid fuel boiling in the gasoline boiling range as well as a portion of an additive comprising the reaction product of the cyclic compound, aldehyde and etheramine as disclosed hereinbefore. The term "major portion" indicates that preferably at least about 90% or more preferably at least about 95% of the fuel composition will comprise a liquid fuel boiling in the gasoline range.

The fuel compositions of this invention can also contain a nitrogen-containing dispersant.

One class of nitrogen-containing dispersants is a hydrocarbyl-substituted amine. These hydrocarbyl substituted amines are well known those skilled in the art. These amines and the methods of making them are disclosed in U.S. Pat. Nos. 3,275,554; 3,438,757; 3,454,555; 3,565,804; 3,755,433; and 3,822,289. Typically, hydrocarbyl substituted amines are prepared by reacting olefins and olefin polymers, including polyalkenes and halogenated derivatives thereof, with amines (mono- or polyamines). Examples of hydrocarbyl substituted amines include poly(propylene) amine; polybutene amine; N-(2-hydroxypropyl)-N-polybutene amine; N-(2-hydroxyethyl)-N'-polybuteneethyleneduamine; N-polybutene-morpholine; N-poly(butene)ethylenediamine; N-poly(propylene) trimethylene-diamine; N-poly(butene)diethylenetriamine; N',N'-poly(butene)tetraethylene-pentamine; NN-dimethyl-N'poly(propylene)-1,3-propylnediamine and the like. The weight average molecular weight of the hydrocarbyl amines will typically range from about 500 to about 3000, the most preferred range being about 1000 to about 1500.

Another class of nitrogen-containing dispersants is Mannich compounds. Mannich compounds are generally formed by the reaction of at least one aldehyde, such as formaldehyde and paraformaldehyde, an amine, and at least one alkyl substituted hydroxyaromatic compound. The amounts of the reagents are such that the molar ratio of hydroxyaromatic compound to formaldehyde to amine typically is in the range from about (1:1:1) to about (1:3:3). The hydroxyaromatic compound is generally an alkyl substituted hydroxyaromatic compound, including phenols. The hydroxyaromatic compounds are those substituted with at least one, and preferably not more than two, aliphatic or alicyclic groups having from about 6 to about 400, or from about 30 to about 300, or from about 50 to about 200 carbon atoms. These groups can be derived from one or more olefins or polyalkenes. In one embodiment, the hydroxyaromatic compound is a phenol substituted with an aliphatic or alicyclic hydrocarbon-based group having a weight average molecular weight ($M_w$) of about 420 to about 2000. Mannich compounds are described in the following U.S. Pat. Nos.: 3,980,569; 3,877,899; and 4,454,059.

The Mannich compounds can be post treated with such reagents as urea, thiourea, carbon disulfide, aldehydes, ketone, carboxylic acids, hydrocarbon-substituted succinic anhydrides, nitrites, epoxides, boron compounds, phosphorus compounds and the like to give additional dispersants. Examples of this type of post treated Mannich compounds can be found in the following U.S. Pat. Nos.: 3,639,242; 3,649,229; 3,649,659; 3,658,836; 3,697,574; 3,702,757; 3,703,536; 3,704,308; and 3,708,422.

Another class of nitrogen-containing dispersants are acylated nitrogen containing compounds, which include amine salts, amides, imides, amidines, amidic acids, amidic salts and imidazolines as well as mixtures thereof. To prepare the acylated nitrogen-containing compounds from the acylating agents and the amino compounds, one or more acylating agents and one or more amino compounds can be heated, optionally in the presence of a normally liquid, substantially inert organic liquid solvent/diluent, at temperatures in the range of about 80° C. up to the decomposition point of either the reactants or the carboxylic derivative but normally at temperatures in the range of about 100° C. up to about 300° C., provided 300° C. does not exceed the decomposition point. Temperatures of about 125° C. to about 250° C. are normally used.

Many patents have described useful acylated nitrogen-containing compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763; and 4,234,435. A typical acylated nitrogen-containing compound of this class is that made by reacting a poly(isobutene)-substituted succinic acid acylating agent (e.g., anhydride, acid, ester, etc.) wherein the poly (isobutene) substituent has about 50 to about 400 carbon atoms, with a mixture of ethylenepolyamines having about 3 to about 7 amino nitrogen atoms per ethylenepolyamine and 1 to about 6 ethylene units made from condensation of ammonia with ethylene chloride.

Also included among acylated nitrogen-containing compounds are amide products resulting from the reaction of a lactone with amines. The lactone is the result of reaction of an alkylphenol with a carboxylic acid. In a preferred embodiment, the alkylphenol will be a polyisobutenylphenol wherein the molecular weight of the polyisobutenyl group ranges from about 300 to about 2000; the carboxylic acid is glyoxylic acid, and the amine is a polyamine. These amide products are disclosed in U.S. Pat. No. 5,336,278.

Another example of amide products resulting from reaction of lactone with amines involve compositions disclosed in European Publication 0823471A. These compositions include products made by the process of reacting an olefinic compound (such as a polyolefin), with at least one omega-oxoalkanoic acid (such as glyoxylic acid), and an aldehyde (such as formaldehyde) or ketone, followed by reaction with an amine.

Similar to the above Application is U.S. Pat. No. 5,696,060. This patent discloses the process of reacting an olefinic compound (such. as polyolefin), with at least one omega-oxoalkanoic acid (such as glyoxylic acid), followed by reaction with an amine. Specifically, this patent discloses a process comprising first reacting, optionally in the presence of an acidic catalyst selected from the group consisting of organic sulfonic acids, heteropolyacids, Lewis acids, and mineral acids, (A) at least one olefinic compound containing at least one group of the formula

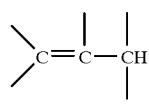
(I)

and (B) at least one carboxylic reactant selected from the group consisting of compounds of the formula

$R^3C(O)(R^4)_nC(O)OR^5$ (IV)

and compounds of the formula

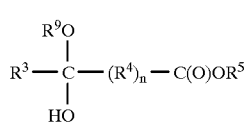
(V)

wherein each of $R^3$, $R^5$ and. $R^9$ is independently H or a hydrocarbyl group, $R^4$ is a divalent hydrocarbylene group, and n is 0 or 1; wherein (A) and (B) are reacted in amounts ranging from more than 1.5 moles (B) per mole of (A) up to about 3 moles (B) per equivalent of (A); then reacting the product formed thereby with from about 0.5 equivalents up to about 2 moles, per mole of (B) of at least one of (C) ammonia or a hydrazine or an amine.

Also included are acylated amine compositions disclosed by U.S. Pat. No. 5,696,067. This patent discloses a composition comprising a compound of the formula

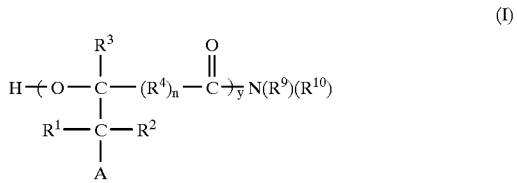

(I)

wherein each of $R^1$ and $R^2$ is H or a hydrocarbon based group; $R^3$ is H or hydrocarbyl; $R^4$ is a divalent hydrocarbylene group; n=0 or 1; y is an integer ranging from 1 to about 200; A is a hydrocarbyl group or a hydroxy-substituted hydrocarbyl group; and each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula $-(Y)_a R^{11}-B$, wherein each Y is a group of the formula $$R^{11}-N(R^{12})- \text{ or } R^{11}-O-,$$

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, and a is 0 or a number ranging from 1 to about 100, provided that no more than three $R^9$, $R^{10}$, and $R^{12}$ contain amide groups, imide-containing groups, acylamino groups or amide-containing groups; or $R^9$ and $R^{10}$ taken together with the adjacent N constitute a nitrogen-containing heterocyclic group, optionally further containing one or more additional heteroatoms selected from the group consisting of N, O and S; or one of $R^9$ and $R^{10}$ taken together with the adjacent N constitute a N—N group.

Also included among acylated nitrogen containing compounds are oxazolines and imidazolines as described in U.S. Pat. No. 5,560,755.

The molecular weight of the acylated nitrogen-containing dispersant will typically range from about 500 to about 20,000, more preferably from about 800 to about 10,000 and most preferably from about 1000 to about 3000.

Another type of nitrogen-containing dispersants is nitrogen-containing carboxylic ester dispersant compositions. These are known in the art, and the preparation of a number of these derivatives is described in, for example, U.S. Pat. Nos. 3,957,854 and 4,234,435. They are prepared by reacting carboxylic esters with at least one amine and preferably at least one polyamine. The carboxylic esters and methods of making the same are known in the art and are disclosed in U.S. Pat. Nos. 3,219,666, 3,381,022 3,522,179 and 4,234,435.

Also included among nitrogen-containing dispersants are aminophenols. Typically, such materials are prepared by reducing hydrocarbyl substituted nitrophenols to the corresponding aminophenol. Useful aminophenols include those described in U.S. Pat. Nos. 4,320,000 and 4,320,021. Aminophenols and methods for preparing them are also described in U.S. Pat. Nos. 4,100,082; 4,200,545; 4,379, 065; and 4,425,138. It should be noted that the term "phenol" as used here in the context of aminophenols is not intended to limit the compounds referred to in that manner as being only monofunctional hydroxyaromatic derivatives but is also intended to include aromatic hydroxy compounds with more than one hydroxy functionality, such as catechols and others as described in the foregoing patents.

Also included among useful nitrogen-containing dispersants are aminocarbamate dispersants such as those described in U.S. Pat. No. 4,288,612.

The liquid fuels of this invention are well known to those skilled in the art and usually contain a major portion of a normally liquid fuel such as hydrocarbonaceous petroleum distillate fuel (e.g., motor gasoline as defined by ASTM Specifications D-439-89) and fuels containing non-hydrocarbonaceous materials such as alcohols, ethers, and organo-nitro compounds (e.g., methanol, ethanol, diethyl ether, methyl ethyl ether, nitromethane).

Oxygen containing molecules (oxygenates) are compounds covering a range of alcohol and ether type compounds. They have been recognized as means for increasing octane value of a base fuel. They have also been used as the sole fuel component, but more often as a supplemental fuel used together with, for example, gasoline, to form the well-known "gasohol" blend fuels. Oxygenated fuel (i.e. fuels containing oxygen-containing molecules) are described in ASTM D-4814-91. The oxygenated fuel of this invention will typically comprise up to about 25% by weight of one or more oxygen-containing molecules.

Methanol and ethanol are the most commonly used oxygen-containing molecules. Other oxygen-containing molecules, such as ethers, for example methyl-t-butyl ether, are more often used as octane number enhancers for gasoline.

Particularly preferred liquid fuels are gasoline, that is, a mixture of hydrocarbons having an ASTM boiling point of 60° C. at the 10% distillation point to about 205° C. at the 90% distillation point, oxygenates, and gasoline-oxygenate blends, all as defined in the aforementioned ASTM Specifications for automotive gasolines. Most preferred is gasoline.

The fuel additive of this invention comprises the reaction product of the cyclic compound, aldehyde or ketone and the etheramine, as described hereinabove in the specification.

The motor fuel compositions of this invention contain an amount of additive sufficient to provide total intake system cleanliness. They are also used in amounts sufficient to prevent or reduce the formation of intake valve or combustion chamber deposits or to remove them where they have formed. Treating levels of the additives used in this invention are often described in terms of parts per million (by weight) (ppm) or pounds per thousand barrels (ptb) of fuel. The ptb values may be multiplied by four to approximately convert the number to ppm. The fuel additive of this invention sufficient to provide total intake system cleanliness or to reduce the formation of intake valve or combustion chamber deposits is present at a level of about 10 to about 5000 parts per million (ppm), preferably about 50 to about 2000 ppm, and more preferably about 100 to about 500 ppm based on the weight of the fuel.

The fuel compositions of the present invention can contain other additives which are well known to those of skill in the art. These can include anti-knock agents such as tetra-alkyl lead compounds, lead scavengers such as haloalkanes, dyes, antioxidants such as hindered phenols, rust inhibitors such as alkylated succinic acids and anhydrides and derivatives thereof, bacteriostatic agents, auxiliary dispersants and detergents, gum inhibitors, fluidizers, metal deactivators, demulsifiers, and anti-icing agents. The fuel compositions of this invention can be lead-containing or lead-free fuels. Preferred are lead-free fuels.

The fluidizers include natural oils, synthetic oils, and mixtures thereof.

Natural oils include mineral oils, vegetable oils, animal oils and oils derived from coal or shale. Synthetic oils include hydrocarbon oils such as alkylated aromatic oils, olefin oligomers, polyetherols, esters, including esters of polycarboxylic acids and polyols, and others.

Especially preferred mineral oils are paraffinic oils containing no more than about 20% unsaturation, that is, no more than about 20% of the carbon to carbon bonds are olefinic.

The polyetherols include polyoxyalkene alcohols, where the alkylene group of the polyoxyalkylene moiety contains about 2 to about 50 carbon atoms. The polyoxyalkylene alcohols can be a monool, diol, or a polyol. In one embodiment, the polyoxyalkylene alcohol can be represented by the formula $$R(O(R'O)_nH)_y$$

wherein each n is independently is a number from 0 to about 50, and in one embodiment 0 to about 25, and in one embodiment about 20 to about 40; each R' independently is selected from the group consisting of alkylene groups of about 2 to about 20 carbon atoms, and mixtures thereof; R is hydrogen, or a hydrocarbyl group with a valence of y and containing 1 to about 50 carbon atoms, and in one embodiment 1 to about 18 carbon atoms; and y is 1, 2, or 3; with the proviso that R cannot be hydrogen when y is 2 or 3. Preferably, the polyoxyalkylene alcohols comprise polymers of ethylene oxide (EO), propylene oxide (PO), butylene oxide (BO) or mixtures thereof (i.e., R' in formula immediately above is an alkylene group of 2 to 4 carbon atoms or mixtures thereof). More preferably the polyetherols comprise PO or BO repeat units or mixtures thereof.

In one embodiment the polyetherol fluidizer is a linear polymer of ethylene and propylene oxide represented by the general formula $$RO\text{---}[CH_2CH(CH_3)O]_n[CH_2CH_2O]_m\text{---}H$$

wherein R is a hydrocarbyl group of 1 to about 20 carbon atoms, and n and m are the repeat units of PO and EO respectively; these polyetherol fluidizers are available commercially as UCON™ Fluids and Lubricants from Union Carbide Corporation. In one preferred embodiment, the polyether fluidizer represented by the above structure contains only PO repeat units, i.e., m in above formula is zero. It has a viscosity index of about 184 (ASTM D 2270), and known commercially as "UCON™ LB-285".

The compositions of this invention can be added directly to the fuel, or they can be diluted with a substantially inert, normally liquid organic diluent such as naphtha, benzene, toluene, xylene or a normally liquid fuel as described above, to form an additive concentrate. These concentrates generally contain from about 20% to about 90% by weight of the composition of this invention and may contain, in addition one or more other conventional additives known in the art or described hereinabove.

EXAMPLES

Example 1

To a reactor equipped with a stirrer, thermal probe, and a Dean Stark trap with a reflux condenser, and with nitrogen flowing at 8.5 L/hr (0.3 std. ft$^3$/hr.) are charged 3325 grams (3.31 mole) of a polyetheramine (nonylphenol initiated polyoxypropylene amine; molecular weight approximately 1004); 282 grams (3.31 moles) of 2-pyrrolidone and 109 grams (3.31 mole) of paraformaldehyde. The mixture is heated in the reactor to about 95° C. with stirring and under nitrogen and maintained at 95° C. for 6 hours. Thereafter, the temperature is increased to 120° C., the nitrogen flow is increased to 28.3 L/hr (1.0 std. ft$^3$/hr.) and the reaction mixture is maintained at that temperature for 4 hours. Water is removed through the Dean-Stark trap throughout the heating period at 95 and. 120° C. About 59 grams of distillate (water) is collected. The reaction flask is cooled to 105° C., a diatomaceous earth filter aid (20 grams) is then charged, and the reaction mixture stirred for another 30 minutes at 105° C. The reaction mixture is filtered over additional filter aid to give the product.

For Examples 2–11, substantially the same procedure as Example 1 is used except that the specific reactants and their relative amounts are set forth in the Table below:

| Example | Cyclic compound (grams/mole) | Etheramine[1] (grams/mole) | Aldehyde (grams/mole) |
|---|---|---|---|
| 2 | 2-Pyrrolidone 25.1/0.30 | $C_{14-16}$ alcohol initiated Poly(PrO)diamine[2] 280/0.3 | Paraformaldehyde 9.7/0.30 |
| 3 | 2-Pyrrolidone 26.3/0.31 | $C_{14-16}$ alcohol initiated Poly(PrO)diamine[2] 147/0.15 | Paraformaldehyde 10.2/0.31 |
| 4 | 2-Pyrrolidone 37.7/0.31 | Nonylphenol initiated Poly(PrO)diamine[3] 550/0.44 | Paraformaldehyde 35.9/0.31 |
| 5 | 2-Pyrrolidone 20.4/0.24 | Nonylphenol initiated Poly(PrO)diamine[4] 318/0.24 | Butyraldehyde 17.3/0.24 |
| 6 | 2-Pyrrolidone 25.3/0.30 | $C_{12-15}$ alcohol initiated Poly(PrO)amine[5] 500/0.30 | Paraformaldehyde 10.1/0.31 |
| 7 | 2-Pyrrolidone 20.9/0.24 | Poly(PrO)amine[6] 250/0.24 | Paraformaldehyde 8.09/0.49 |
| 8 | 2-Pyrrolidone 118/1.39 | Poly(PrO)amine[7] 973/1.39 | Paraformaldehyde 45.3/1.39 |
| 9 | ε-Caprolactam 55.9/0.49 | Nonylphenol initiated Poly(PrO)amine[8] | Paraformaldehyde 16.3/0.49 |
| 10 | Ethylene urea 18.3/0.22 | Nonylphenol initiated Poly(PrO)amine[8] 436/0.42 | Paraformaldehyde 14.0/0.42 |
| 11 | Barbituric acid 25.4/0.20 | Nonylphenol initiated Poly(PrO)amine[8] 406/0.40 | Paraformaldehyde 13.1/0.42 |

[1]PrO = oxypropylene; thus Poly(PrO)amine is Polyoxypropyleneamine
[2]Prepared by two sequential cyanoethylation/reduction steps on a $C_{14-16}$ alcohol initiated polyoxypropylene monool (Emkarox ™ AF-20 from ICI); molecular weight (MW) approximately 949.
[3]Prepared by sequential cyanoethylation/reduction step on a nonylphenol initiated polyoxypropylene monool (DFA-40 from ICI); MW~1241
[4]Prepared by sequential cyanoethylation/reduction step on a nonylphenol initiated polyoxypropylene monool (NP-14 from Arco); MW~1326
[5]Prepared by reductive amination of $C_{12-15}$ alcohol initiated polyoxypropylene monool (Dalcol ™-21 from Arco); MW~1713
[6]Jeffamine ™ XTJ-241; MW~1020
[7]MW~1350;
[8]Same etheramine as Example 1.

Example 13

(an alternate method of preparing the composition of Example 7)

To a reactor equipped with a stirrer, thermal probe, and a Dean Stark trap with a reflux condenser, and with nitrogen flowing at 8.5 L/hr (0.3 std. ft$^3$/hr.) are charged 250 grams (0.24 mole) of a polyoxypropyleneamine (Jeffamine® XTJ-241 from Huntsmann; molecular weight approximately 1020); 20.9 grams (0.24 mole) of 2-pyrrolidone, 8.09 grams (0.49 mole) of paraformaldehyde, 69.7 g of toluene, and 0.07 grams of 50 wt % aqueous potassium hydroxide. The mixture is heated in the reactor to about 95° C. with stirring and under nitrogen and maintained at 95° C. for 6 hours. Thereafter, the temperature is increased to 120° C., and about 58 grams of toluene is removed from the reactor by distillation under reduced pressure. Water is removed through the Dean-Stark trap throughout the heating period at 90 and 120° C. The reaction mixture is cooled to 100° C. and a diatomaceous earth filter aid (6 grams) is then charged, and the reaction mixture stirred for another 30 minutes at 100° C. The reaction mixture is filtered to give the product.

Example 14

To a reactor equipped with a stirrer, thermal probe, and a Dean Stark trap with a reflux condenser, and with nitrogen flowing at 8.5 L/hr (0.3 std. ft³/hr.) are charged 544 grams (0.33 mole) of a polyetheramine (prepared by reductive amination of a nonylphenol initiated polyoxybutylene alcohol, containing about 18–22 units of BO), 10.9 grams (0.33 mole) of paraformaldehyde, and 28.1 grams (0.33 mole) of 2-pyrrolidinone. The mixture is heated in the reactor to about 95° C. with stirring and under nitrogen and maintained at 95° C. for 2 hours. Thereafter, the temperature is increased to 120° C., the nitrogen sparging is increased to 28.3 L/hr (1.0 std. ft³/hr.) and the reaction mixture is maintained at that temperature for 2 hours while collecting water through a Dean-Stark trap. A diatomaceous earth filter aid (2.5 grams) is then charged, and the reaction mixture stirred for another 30 minutes at 120° C. The reaction mixture is filtered over additional filter aid to give the product.

Example 15

To a reactor equipped with a stirrer, thermal probe, and a Dean Stark trap with a reflux condenser, and with nitrogen flowing at 8.5 L/hr (0.3 std. ft³/hr.) are charged 510 grams (0.32 mole) of a polyetheramine (prepared by cyanoethylation, followed by reduction of a tridecyl alcohol initiated polyoxybutylene alcohol, containing about 17–21 units of BO), 10.6 grams (0.32 mole) of paraformaldehyde, and 27.2 grams (0.32 mole) of 2-pyrrolidinone. The mixture is heated in the reactor to about 95° C. with stirring and under nitrogen and maintained at 95° C. for 2 hours. Thereafter, the temperature is increased to 120° C., the nitrogen sparging is increased to 28.3 L/hr (1.0 std. ft³/hr.) and the reaction mixture is maintained at that temperature for 2 hours while collecting water through a Dean-Stark trap. A diatomaceous earth filter aid (2.5 grams) is then charged, and the reaction mixture stirred for another 30 minutes at 120° C. The reaction mixture is filtered over additional filter aid to give the product.

Each of the documents referred to above is incorporated herein by reference. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the amount, range, and ratio limits set forth herein may be combined. As used herein, the expression "consisting essentially of" permits the inclusion of substances which do not materially affect the basic and novel characteristics of the composition under consideration.

What is claimed is:

1. A composition comprising the reaction product of:
   (A) a cyclic compound containing a 5, 6, or 7-member ring, said ring containing at least one nitrogen and at least one carbonyl group, at least one said carbonyl group being adjacent to at least one said nitrogen;
   (B) an aldehyde or ketone of 1 to about 15 carbon atoms, or a reactive equivalent thereof; and
   (C) an etheramine represented by the formula

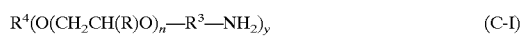

wherein in formula (C-I), each n independently is a number from 0 to about 50; each R independently is selected from the group consisting of hydrogen, hydrocarbyl groups of 1 to about 16 carbon atoms, and mixtures thereof; $R^3$ is selected from the group consisting of hydrocarbylene groups of about 2 to about 18 carbon atoms and groups represented by the formula

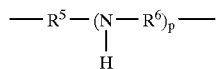

wherein $R^5$ and each $R^6$ are independently hydrocarbylene groups of about 2 to about 10 carbon atoms; p is a number from 1 to about 4; y is 1, 2 or 3; and $R^4$ is a hydrocarbyl group having a valence of y and containing 1 to about 50 carbon atoms when y is 1, and 1 to about 18 carbon atoms when y is 2 or 3.

2. The composition of claim 1 wherein the cyclic compound (A) is selected from the group consisting of isocyanuric acid, barbituric acid and reactive equivalents thereof.

3. The composition of claim 1 wherein the cyclic compound (A) is an ethylene urea.

4. The composition of claim 1 wherein the cyclic compound (A) is a cyclic amide represented by the formula

wherein in formula (A-I), $R^1$ and $R^2$ are independently selected from the group consisting of hydrogen and hydrocarbyl groups of 1 to about 50 carbon atoms or wherein at least two of the $R^1$ and $R^2$ groups together form a cyclic structure; and x is a number from 3 to 5.

5. The composition of claim 4 wherein in formula (A-I), each $R^1$ and $R^2$ is hydrogen.

6. The composition of claim 4 wherein in formula (A-I) x is 3.

7. The composition of claim 4 wherein in formula (A-I) x is 5.

8. The composition of claim 1 wherein the aldehyde (B) is selected from the group consisting of paraformaldehyde, acetaldehyde, butyraldehyde and reactive equivalents thereof.

9. The composition of claim 1 wherein the etheramine (C) is represented by the formula

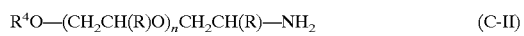

wherein $R^4$ is a hydrocarbyl group of 1 to about 50 carbon atoms; n is a number from 1 to about 50; and each R independently is selected from the group consisting of hydrogen, hydrocarbyl group of 1 to about 16 carbon atoms and mixtures thereof.

10. The composition of claim 9 wherein in formula (C-II), R is methyl and $R^4$ is nonyl-phenyl.

11. The composition of claim IO wherein the cyclic compound (A) is ethylene urea, and the aldehyde (B) is formaldehyde.

12. The composition of claim 11 wherein the mole ratio of the etheramine(C) to formaldehyde (B) to ethylene urea (A) is about 2:2:1.

13. The composition of claim 10 wherein the cyclic compound (A) is barbituric acid and the aldehyde (B) is formaldehyde.

14. The composition of claim 13 wherein the mole ratio of the etheramine (C) to formaldehyde (B) to barbituric acid (A) is about 2:2:1.

15. The composition of claim 1 wherein the etheramine (C) is represented by the formula $$R^4O(CH_2CH(R)O)_nCH_2CH(R)(NHCH_2CH_2)_kNH_2 \qquad \text{(C-VI)}$$

wherein in formula (C-VI), k is number from 1 to about 5; n is number from 0 to about 50; $R^4$ is a hydrocarbyl group of 1 to about 50 carbon atoms; and each R independently is selected from the group consisting of hydrogen, hydrocarbyl groups of 1 to about 16 carbon atoms and mixtures thereof.

16. The composition of claim 1 wherein the etheramine (C) is represented by the formula $$R^4O(CH_2CH(R)O)_n((CH_2)_3NH)_qH \qquad \text{(C-VII)}$$

wherein in formula (C-VII), q is a number from 1 to about 5; n is a number from 0 to about 50; $R^4$ is a hydrocarbyl group of 1 to about 50 carbon atoms; and each R is independently selected from the group consisting of hydrogen, hydrocarbyl groups of 1 to about 16 carbon atoms and mixtures thereof.

17. The composition of claim 16 wherein in formula (C-VII), q is 1 or 2; $R^4$ is a hydrocarbyl group of about 10 to about 18 carbon atoms and R is methyl.

18. The composition of claim 17 wherein the cyclic compound (A) is 2-pyrrolidone; the aldehyde (B) is formaldehyde; and in formula (C-VII) q is 1; and $R^4$ is nonylphenyl.

19. The composition of claim 18 wherein the mole ratio of etheramine (C) to formaldehyde (B) to 2-pyrrolidone (A) is about 1:1:1.

20. The composition of claim 10 wherein the cyclic compound (A) is ε-caprolactam; and the aldehyde (B) is formaldehyde.

21. The composition of claim 20 wherein the mole ratio of etheramine (C) to formaldehyde (B) to ε-caprolactam (A) is about 1:1:1.

22. The composition of claim 10 wherein the cyclic compound (A) is 2-pyrrolidone and the aldehyde (B) is formaldehyde.

23. The composition of claim 22 wherein the mole ratio of etheramine (C) to formaldehyde (B) to 2-pyrrolidone (A) is about 1:1:1.

24. The composition of claim 17 wherein the cyclic compound (A) is 2-pyrrolidone; the aldehyde (B) is formaldehyde; and q is 2.

25. The composition of claim 24 wherein the mole ratio of etheramine (C) to formaldehyde (B) to 2-pyrrolidone (A) is about 1:1:1.

26. The composition of claim 24 wherein the mole ratio of etheramine (C) to formaldehyde (B) to 2-pyrrolidone (A) is about 1:2:2.

27. A composition comprising at least one compound represented by the formula

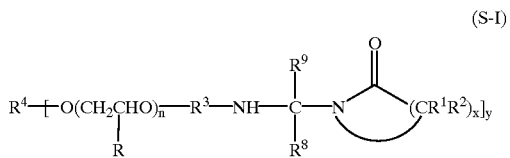

(S-I)

wherein in formula (S-I), each each R independently is selected from the group consisting of hydrogen, hydrocarbyl groups of 1 to about 16 carbon atoms, and mixtures thereof; $R^1$ and $R^2$ are independently selected from the group consisting of hydrogen and hydrocarbyl groups of 1 to about 50 carbon atoms, or wherein at least two of the $R^1$ and $R^2$ groups together form a cyclic structure; $R^3$ is selected from the group consisting of hydrocarbylene groups of about 2 to about 18 carbon atoms and groups represented by the formula

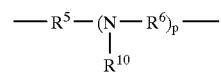

wherein $R^5$ and each $R^6$ are independently hydrocarbylene groups of about 2 to about 10 carbon atoms; $R^{10}$ is a group represented by the formula

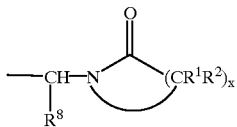

wherein $R^1$, $R^2$, $R^8$ and x are as defined elsewhere in this claim, and p is a number from 1 to about 4; y is 1, 2 or 3; $R^4$ is a hydrocarbyl group having a valence of y and containing 1 to about 50 carbon atoms when y is 1 and 1 to about 18 carbon atoms when y is 2 or 3; each $R^8$ and $R^9$ are independently selected from the group consisting of hydrogen and hydrocarbyl groups of 1 to about 14 carbon atoms; x is a number from 3 to 5; and n is a number from 0 to about 50.

28. A fuel composition comprising a major amount of hydrocarbon in the gasoline boiling range and a minor amount of the composition of claim 1.

29. The fuel composition of claim 28 wherein the composition of claim 1 is present at a level of about 10 to about 5000 parts per million based on the weight of the hydrocarbon in the gasoline boiling range.

30. A concentrate comprising about 10% to about 90% by weight of an organic diluent and the composition of claim 1.

31. The composition of claim 1 further comprising a nitrogen containing dispersant.

32. The composition of claim 31 wherein said nitrogen-containing dispersant is present at a level of about 10 to about 200 ppm based on the weight of the hydrocarbon in the gasoline boiling range.

33. The composition of claim 31 wherein said nitrogen containing dispersant is selected from the group consisting of hydrocarbyl amines, acylated nitrogen-containing compounds, Mannich compounds and mixtures thereof.

34. The composition of claim 33 wherein the hydrocarbylamine is a polybuteneamine.

35. The composition of claim 1 further comprising a fluidizer.

36. The composition of claim 35 wherein the fluidizer is a polyetherol.

37. The composition of claim 36 wherein the polyetherol is an polyoxyalkylene alcohol wherein the alkylene group contains about 2 to about 20 carbon atoms.

38. A method for reducing the intake valve deposits in an internal combustion engine, comprising fueling said engine with the fuel composition of claim 28.

* * * * *